United States Patent
Watanabe et al.

(10) Patent No.: US 9,366,915 B2
(45) Date of Patent: Jun. 14, 2016

(54) LCD PANEL, ELECTRONIC DEVICE, AND METHOD FOR PRODUCING LCD PANEL

(75) Inventors: Hisashi Watanabe, Osaka (JP); Akira Sakai, Osaka (JP); Yuichi Iyama, Osaka (JP); Akiko Miyazaki, Osaka (JP); Eiji Satoh, Osaka (JP); Yasushi Asaoka, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 192 days.

(21) Appl. No.: 14/236,130

(22) PCT Filed: Jul. 25, 2012

(86) PCT No.: PCT/JP2012/068835
§ 371 (c)(1),
(2), (4) Date: Jan. 30, 2014

(87) PCT Pub. No.: WO2013/018617
PCT Pub. Date: Feb. 7, 2013

(65) Prior Publication Data
US 2014/0152945 A1    Jun. 5, 2014

(30) Foreign Application Priority Data
Aug. 1, 2011 (JP) ................... 2011-168351

(51) Int. Cl.
*G02F 1/1339* (2006.01)
*G02F 1/1333* (2006.01)

(52) U.S. Cl.
CPC ...... *G02F 1/13394* (2013.01); *G02F 1/133377* (2013.01); *G02F 2001/133388* (2013.01)

(58) Field of Classification Search
CPC .......... G02F 1/133377; G02F 1/13394; G02F 1/1339; G02F 1/1334; G02F 2001/133388

USPC ......................... 349/153, 156, 190
See application file for complete search history.

(56) References Cited

U.S. PATENT DOCUMENTS 4,834,509 A    5/1989 Gunjima et al.
6,163,357 A * 12/2000 Nakamura .......... G02F 1/13394
                                                    349/151

(Continued)

FOREIGN PATENT DOCUMENTS

JP    06-186574 A    7/1994
JP    07-333625 A    12/1995

(Continued)

OTHER PUBLICATIONS

English translation of Official Communication issued in corresponding International Application PCT/JP2012/068835, mailed on Feb. 13, 2014.

(Continued)

*Primary Examiner* — Paisley L Arendt
(74) *Attorney, Agent, or Firm* — Keating & Bennett, LLP (57) ABSTRACT

A liquid crystal display panel (100A) includes: a first substrate (2) and a second substrate (3), a liquid crystal layer (1) retained between the first substrate (2) and the second substrate (3), and plurality of pixels. The liquid crystal layer (1) has a first liquid crystal region (81) and a second liquid crystal region (82) provided outside the first liquid crystal region (81). The first liquid crystal region (81) is essentially composed of a nematic liquid crystal material alone, whereas the second liquid crystal region (82) has a plurality of liquid crystal subregions (11) containing a nematic liquid crystal material and polymer-containing walls (12) formed between adjacent ones of the plurality of liquid crystal subregions (11). The plurality of pixels include pixels accounting for the first liquid crystal region (81) and pixels accounting for the second liquid crystal region (82).

14 Claims, 7 Drawing Sheets

(56) References Cited

U.S. PATENT DOCUMENTS 6,449,028 B1 * 9/2002 Grupp ................... G02F 1/1339
  349/127
2010/0302488 A1 * 12/2010 Asaoka ................. G02F 1/1334
  349/123

FOREIGN PATENT DOCUMENTS

| JP | 08-160437 A | 6/1996 |
| JP | 09-222613 A | 8/1997 |
| JP | 09-255706 A | 9/1997 |
| JP | 10-104587 A | 4/1998 |
| JP | 3389461 B2 | 3/2003 |

OTHER PUBLICATIONS

Official Communication issued in International Patent Application No. PCT/JP2012/068835, mailed on Sep. 11, 2012.

* cited by examiner

LCD PANEL, ELECTRONIC DEVICE, AND METHOD FOR PRODUCING LCD PANEL

TECHNICAL FIELD

The present invention relates to a liquid crystal display panel, an electronic device, and a production method for a liquid crystal display panel.

BACKGROUND ART

Liquid crystal display devices have advantages such as light weight, thinness, and low power consumption, and are utilized not only for large-size television sets but also as small-sized display devices, e.g., display sections of mobile phones.

A liquid crystal display device includes a liquid crystal display panel, a backlight device, circuitry and a power supply for supplying various electrical signals to the liquid crystal display panel, and a housing which accommodates these. The liquid crystal display panel has a displaying region in which a plurality of pixels are arrayed, and a frame region around it.

The displaying region (active area) of a generic liquid crystal display panel includes pixel electrodes, thin film transistors (TFTs), and the like provided therein, in which images, videos, or the like are displayed. In the frame region are provided: a sealing portion at which substrates are attached together so that a liquid crystal material is sealed in between the substrates; connection lines connected to the gate electrodes and source electrodes of the TFTs; terminals for connection with external driving circuits which input signal/scanning voltages; and so on. In the present specification, any region in which connection lines to the gate electrodes and source electrodes of TFTs, terminals for connection with external driving circuits which input signal/scanning voltages, and the like are located may be referred to as a connection region. In order to prevent deteriorations in display quality at the outer periphery of the active area due to leakage of light from the backlight, disorderly alignment of liquid crystal molecules, and so on, a black mask (light-shielding member) is usually provided in the frame region. Thus, the frame region is a region not contributing to displaying (invalid displaying portion). While liquid crystal display panels are becoming narrower and narrower in their frames each year, it is difficult to eliminate the frame region.

Figure 11:
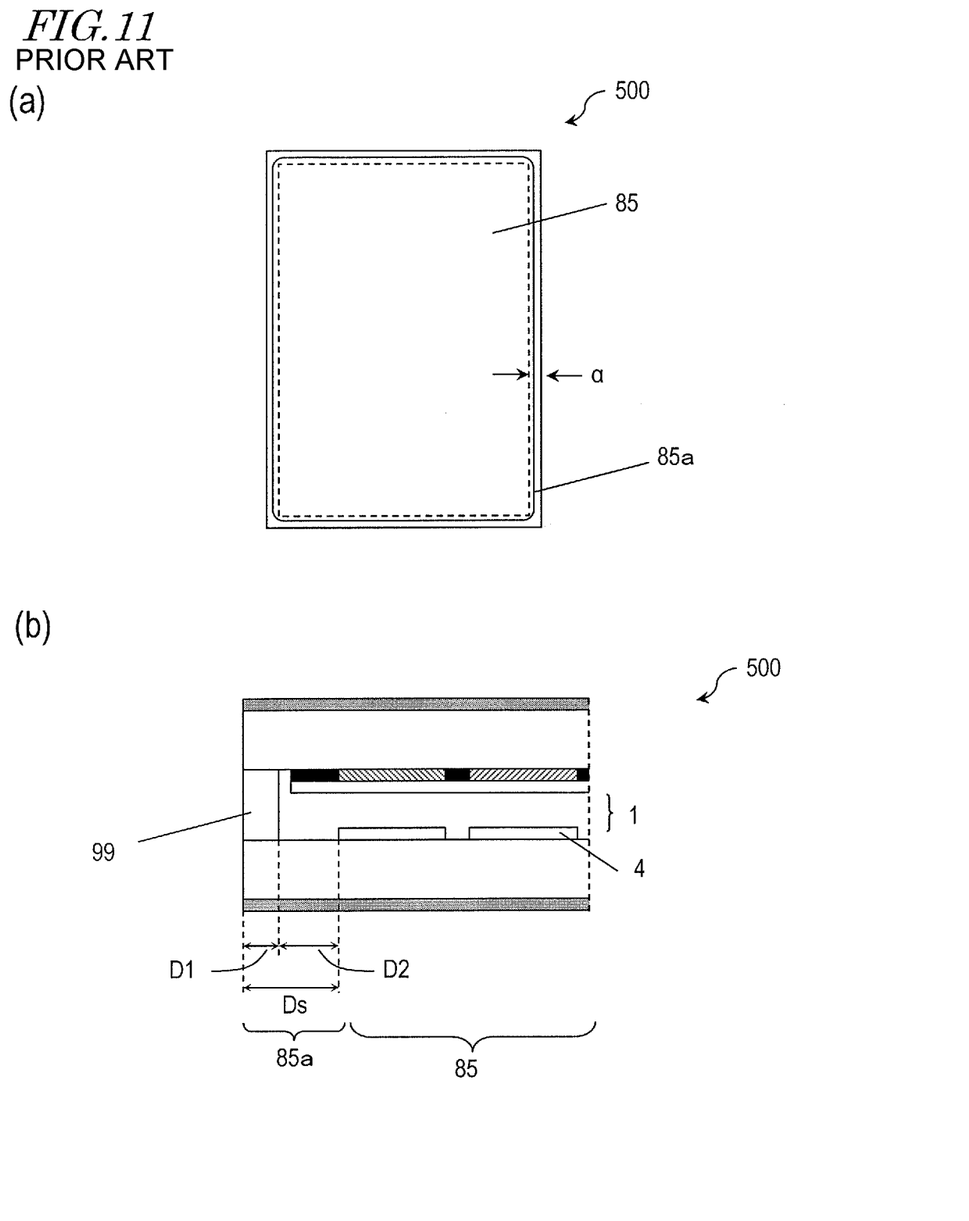

Now, limitations as to how narrow a frame region 85a of a generic liquid crystal display panel (e.g., a TN (Twisted Nematic) type liquid crystal panel) 500 can be will be described with reference to FIG. 11(*a*) and FIG. 11(*b*). FIG. 11(*a*) is a schematic plan view of the liquid crystal display panel 500, and FIG. 11(*b*) is a schematic cross-sectional view of an α portion shown in FIG. 11(*a*).

The liquid crystal display panel 500 has a displaying region 85 and a frame region 85a located at the periphery of the displaying region 85. A plurality of pixel electrodes 4 are formed in the displaying region 85 of the liquid crystal display panel 500. The frame region 85a is a region which does not contribute to displaying. In the frame region 85a of the liquid crystal display panel 500, a sealing portion 99 is formed so as to surround the liquid crystal layer 1. The width Ds of the frame region 85a is expressed as a sum of the width D1 of the sealing portion 99 and the distance D2 between the sealing portion 99 and a pixel electrode 4 which is adjacent to the sealing portion 99. The sealing portion 99 is formed by using a dispenser apparatus, a screen printer, or the like to apply a sealant on a substrate so as to constitute a predetermined pattern, and, after this is attached to the other substrate, curing the sealant. The final width D1 of the sealing portion 99 is about 1 mm or more.

Patent Document 1 discloses a method in which a pair of substrates are attached together via a sealant that is applied so as to constitute a predetermined pattern, and thereafter the substrates are cut up, together with the sealant, to thereby produce a plurality of liquid crystal display panels. In the disclosed method, the width D1 of the sealing portion 99 is made about 1 mm or less. According to the method disclosed in Patent Document 1, although the width of the sealing portion 99 can be made about 1 mm or less, making the width D1 of the sealing portion 99 too thin would result in an inadequate strength which induces an insufficiency in that the sealing portion 99 may peel off under a high temperature and high humidity. The above insufficiency will become especially outstanding when the width D1 of the sealing portion 99 is about 0.5 mm or less, and thus the sealing portion 99 of the liquid crystal display panel which is currently mass-produced by the Applicants has a width greater than 0.5 mm.

Next, the reason why it is difficult for the frame region 85a of the liquid crystal display panel 500 to have a width Ds of about 0.5 mm or less will be described.

In the liquid crystal display panel 500, the distance D2 which is needed to maintain the alignment of the liquid crystal material contained in the liquid crystal layer 1 is about 0.2 mm or more. When the distance D2 is less than about 0.2 mm, the liquid crystal material alignment will become disorderly due to the influence of the sealing portion 99, thus causing poor displaying such as a lowered contrast ratio. This means that, in order for the frame region 85a to have a width Ds of about 0.5 mm or less, the width D1 of the sealing portion 99 needs to be about 0.3 mm or less. On the other hand, if the width D1 of the sealing portion 99 is about 0.1 mm or less, the sealing portion 99 will peel off due to inadequate strength, thus causing poor displaying. When the precision of a dispenser apparatus used for forming the sealing portion 99 is taken into consideration, it is very difficult to control the width D1 of the sealing portion 99 to about 0.2 mm to 0.3 mm with a good production yield.

On the other hand, Patent Document 2 discloses a liquid crystal display panel having a polymer dispersed liquid crystal (PDLC) layer in which a curable vinyl compound is used. Patent Document 2 states that forming a polymer dispersed liquid crystal layer from a curable vinyl compound provides an effect of adhesively bonding the pair of substrates, without even forming the sealing portion 99 which would belong to the liquid crystal display panel 500.

CITATION LIST

Patent Literature

[Patent Document 1] Japanese Patent No. 3389461
[Patent Document 2] Japanese Patent No. 2550627

SUMMARY OF INVENTION

Technical Problem

However, although Patent Document 2 states that there is no need to form a sealing portion, it does not disclose a production method for a liquid crystal display panel which lacks a sealing portion.

The present invention has been made in view of the above problems, and an objective thereof is to provide a liquid crystal display panel which is suitable for a narrowed frame region and which has a good mass production efficiency, as well as a production method for such a liquid crystal display panel.

Solution to Problem

A liquid crystal display panel according to an embodiment of the present invention is a liquid crystal display panel comprising: a first substrate and a second substrate and a liquid crystal layer retained between the first substrate and the second substrate, the liquid crystal display panel having a plurality of pixels, wherein the liquid crystal layer has a first liquid crystal region and a second liquid crystal region provided outside the first liquid crystal region; the first liquid crystal region is composed essentially of a nematic liquid crystal material alone; the second liquid crystal region has a plurality of liquid crystal subregions containing a nematic liquid crystal material and polymer-containing walls formed between adjacent ones of the plurality of liquid crystal subregions; and the plurality of pixels include pixels accounting for the first liquid crystal region and pixels accounting for the second liquid crystal region.

In one embodiment, when viewed from a normal direction of the liquid crystal display panel, at least one outer side face of the second liquid crystal region is level with at least one of side faces of the first substrate and side faces of the second substrate.

In one embodiment, a sealing portion is formed between at least one side face of the second liquid crystal region and at least one side face of the first substrate.

In one embodiment, no sealing portion is formed between the first substrate and the second substrate.

In one embodiment, the above liquid crystal display panel further comprises: a first alignment film and a second alignment film formed between the first liquid crystal region and second liquid crystal region and the first substrate and second substrate so as to be in contact with the first liquid crystal region and the second liquid crystal region; and polarizers respectively provided on sides of the first substrate and the second substrate opposite from the liquid crystal layer.

In one embodiment, the liquid crystal display panel is a normally-black mode liquid crystal display panel.

In one embodiment, the liquid crystal display panel is a normally-white mode liquid crystal display panel.

In one embodiment, the nematic liquid crystal material has positive dielectric anisotropy; at least one of the first alignment film and the second alignment film is a horizontal alignment film; the horizontal alignment film has been subjected to an alignment treatment; and, in the first liquid crystal region and in the plurality of liquid crystal subregions, in the absence of applied voltage, an in-plane azimuth of liquid crystal molecules at an interface with the horizontal alignment film which has been subjected to an alignment treatment is parallel to an azimuth defined by the alignment treatment.

In one embodiment, the above liquid crystal display panel includes two liquid crystal regions such that, in the absence of applied voltage, an azimuth of tilt of liquid crystal molecules at an interface with the first alignment film in the first liquid crystal region and in the plurality of liquid crystal subregions differs from an azimuth of tilt of liquid crystal molecules at an interface with the second alignment film in the first liquid crystal region and in the plurality of liquid crystal subregions.

In one embodiment, the nematic liquid crystal material has negative dielectric anisotropy; and the first alignment film and the second alignment film are vertical alignment films.

In one embodiment, the second liquid crystal region has a width of 1.5 mm or less.

In one embodiment, the above liquid crystal display panel further comprises a side-face sealing resin portion formed so as to be in contact with an outer side face of the second liquid crystal region, a side face of the first substrate, and a side face of the second substrate.

An electronic device according to an embodiment of the present invention comprises first and second liquid crystal display panels, each of the first and second liquid crystal display panels being the above liquid crystal display panel, wherein the first and second liquid crystal display panels are disposed so that a first side face and a second side face adjoin each other, the first side face being a side face of the first liquid crystal display panel containing a side face of the second liquid crystal region, and the second side face being a side face of the second liquid crystal display panel containing a side face of the second liquid crystal region.

In one embodiment, the above electronic device is foldable around an axis which is a boundary between the first side face and the second side face.

A production method for a liquid crystal display panel according to an embodiment of the present invention comprises: (A) a step of providing a first substrate and a second substrate; (B) a step of applying a nematic liquid crystal material onto a first region of a surface of the first substrate; (C) a step of applying a liquid mixture containing a nematic liquid crystal material and a monomer onto a second region of a surface of the first substrate, the second region being located outside of the first region; (D) a step of attaching together the first substrate and the second substrate; and (E) a step of polymerizing the monomer.

Advantageous Effects of Invention

According to an embodiment of the present invention, there is provided a liquid crystal display panel which is suitable for a narrowed frame region and which has a good mass production efficiency.

BRIEF DESCRIPTION OF DRAWINGS

FIG. 1 (*a*) is a schematic plan view of a liquid crystal display panel 100A according to an embodiment of the present invention; (*b*) is a schematic cross-sectional view of the liquid crystal display panel 100A along line I-I' in FIG. 1(*a*); and (*c*) is a schematic cross-sectional view for describing a polymer-containing liquid crystal region 82 of the liquid crystal display panel 100A.

FIG. 4 (*a*) is a schematic cross-sectional view for describing a liquid crystal display panel 100C according to another embodiment of the present invention; and (*b*) is a schematic plan view for describing the liquid crystal display panel 100C.

FIG. 5 (*a*) is a schematic plan view of a liquid crystal display panel 100D according to still another embodiment of the present invention; and (*b*) is a schematic plan view for describing the liquid crystal display panel 100D.

FIGS. 6 (*a*) and (*b*) are schematic perspective views for describing an electronic device 200.

FIG. 7 (*a*) is a schematic perspective view for describing a production method of the liquid crystal display panel 100A; and (*b*) is a schematic cross-sectional view of one TFT substrate 44.

FIG. 8 (a) is a schematic perspective view for describing a production method of the liquid crystal display panel 100A; and (b) is a schematic cross-sectional view for describing a production method of the liquid crystal display panel 100A, taken along line III-III' in (a).

FIG. 9 (a) is a schematic perspective view for describing a production method of the liquid crystal display panel 100A; and (b) is a schematic cross-sectional view for describing a production method of the liquid crystal display panel 100A, taken along line VI-VI' in (a).

FIG. 10 (a) is a schematic perspective view for describing a production method of the liquid crystal display panel 100A; and (b) is a schematic cross-sectional view for describing a production method of the liquid crystal display panel 100A, taken along line V-V' in (a).

FIG. 11 (a) is a schematic plan view of a conventional liquid crystal display panel 500; and (b) is a schematic cross-sectional view of a portion shown at α in (a).

DESCRIPTION OF EMBODIMENTS

Hereinafter, with reference to the drawings, liquid crystal display panels according to embodiments of the present invention will be described. However, the present invention is not limited to the following embodiments.

Figure 1:
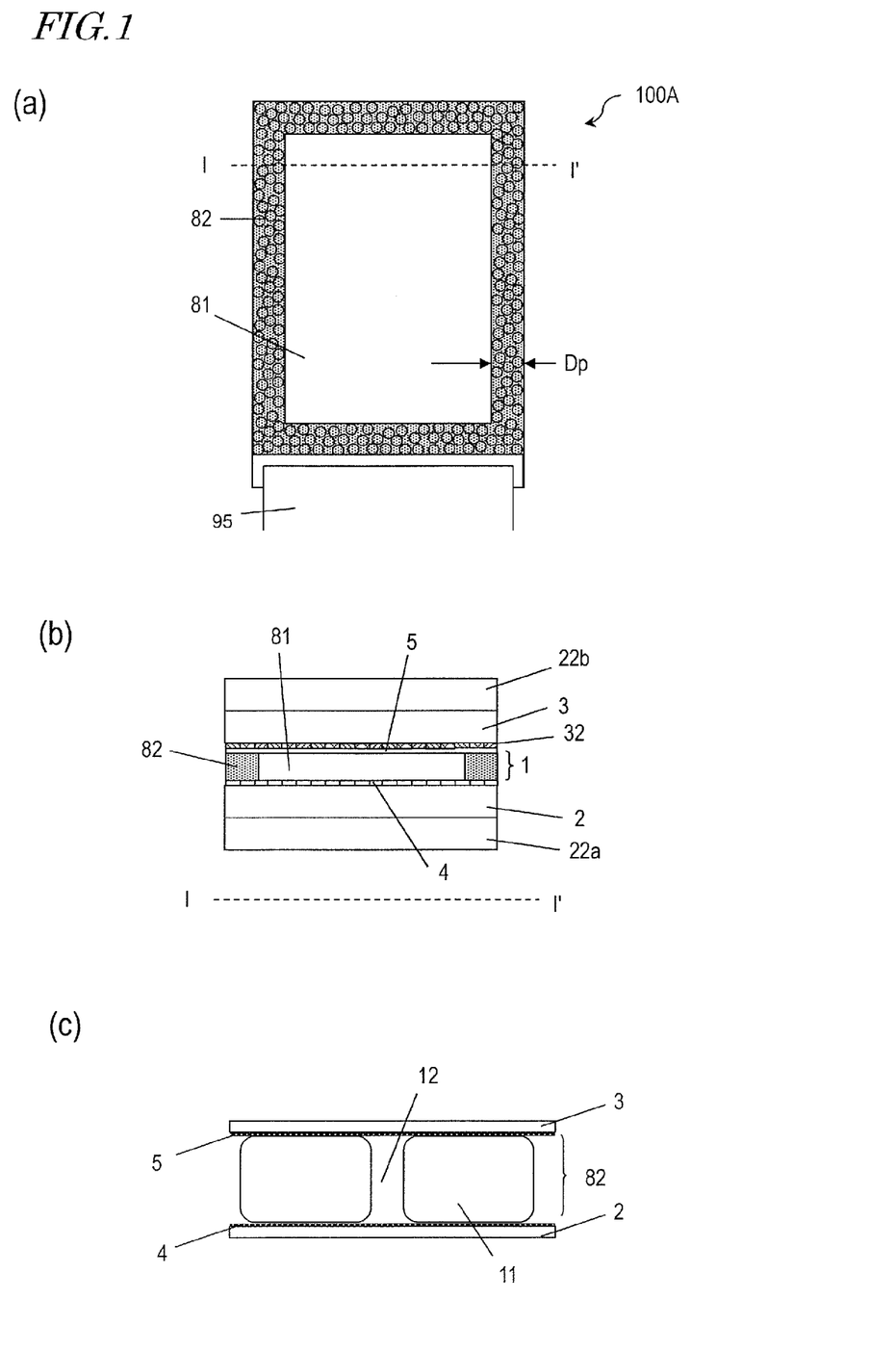
Figure 2:
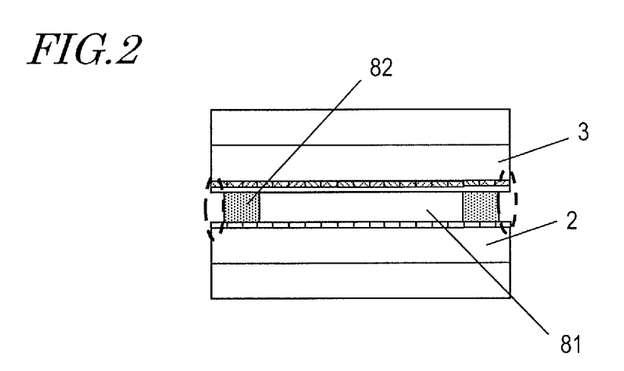
FIG. 2 A schematic cross-sectional view of a liquid crystal display panel.

With reference to FIG. 1, a liquid crystal display panel 100A according to an embodiment of the present invention is described. FIG. 1(a) shows a schematic plan view of the liquid crystal display panel 100A, and FIG. 1(b) shows a schematic cross-sectional view of the liquid crystal display panel 100A along line I-I' in FIG. 1(a). FIG. 1(c) is a schematic cross-sectional view showing enlarged a part of the polymer-containing liquid crystal region 82 shown in FIG. 1(b). FIG. 2 is a schematic cross-sectional view of a liquid crystal display panel according to a comparative example.

As shown in FIG. 1(a), FIG. 1(b), and FIG. 1(c), the liquid crystal display panel 100A includes a first substrate 2 and a second substrate 3, as well as a liquid crystal layer 1 interposed between the first substrate 2 and the second substrate 3, and has a plurality of pixels. The liquid crystal layer 1 has a first liquid crystal region 81 and a second liquid crystal region 82 which is provided outside the first liquid crystal region 81. The first liquid crystal region 81 is essentially composed of a nematic liquid crystal material alone, whereas the second liquid crystal region 82 includes a plurality of liquid crystal subregions 11 containing a nematic liquid crystal material and polymer-containing walls 12 which are formed between adjacent ones of the plurality of liquid crystal subregions 11. The first liquid crystal region 81 may also be referred to as the nematic liquid crystal region 81, whereas the second liquid crystal region 82 may also be referred to as the polymer-containing liquid crystal region 82. The plurality of pixels include pixels accounting for the first liquid crystal region 81, and pixels accounting for the second liquid crystal region 82. In the liquid crystal display panel 100A, no sealing portion is formed between the first substrate 2 and the second substrate 3. As referred to herein, a sealing portion is to be made of a sealant and contain no liquid crystal material. In the liquid crystal display panel 100A, there is no need to form a sealing portion for attaching together the first substrate 2 and the second substrate 3 in a manner of surrounding the nematic liquid crystal region 81, and therefore the width of any region not contributing to displaying can be reduced. Moreover, a liquid crystal display panel 100A with a high contrast ratio and luminance is obtained. Furthermore, a liquid crystal display panel 100A with a high mass production efficiency is provided, the details of which will be described later.

The first liquid crystal region 81 and the liquid crystal subregions 11 may contain a negative nematic liquid crystal material, for example.

The liquid crystal display panel 100A includes vertical alignment films (not shown) which are respectively formed on the first substrate 2 and the second substrate 3 so as to be in contact with the liquid crystal layer 1. The liquid crystal display panel 100A includes a first vertical alignment film (e.g., AL60101 manufactured by JSR Corporation) which is formed on the first substrate 2 so as to be in contact with the liquid crystal layer 1, and a second vertical alignment film which is formed on the second substrate 3 so as to be in contact with the liquid crystal layer 1. In the absence of applied voltage, the liquid crystal material in the nematic liquid crystal region 81 and the liquid crystal subregions 11 are aligned perpendicularly to the first substrate 2 and the second substrate 3. The width Dp of the polymer-containing liquid crystal region 82 is preferably 1.5 mm or less, and more preferably not less than 0.5 mm and not more than 1.5 mm. If it is less than 0.5 mm, the liquid crystal display panel 100A may deteriorate in mechanical strength. If it is more than 1.5 mm, the proportion of the polymer-containing liquid crystal region 82, whose contrast ratio and luminance are low, will increase, which is not very preferable; however, in applications where high display quality is not required, the width Dp may even be greater. In the liquid crystal display panel 100A, the width Dp of the polymer-containing liquid crystal region 82 is about 1 mm.

Preferably, when viewed from the normal direction of the liquid crystal display panel 100A, at least one of the outer side faces of the polymer-containing liquid crystal region 82 is level with at least one of the side faces of the first substrate 2 and the side faces of the second substrate 3. The reason is that, if the outer side faces of the polymer-containing liquid crystal region 82 are closer to the nematic liquid crystal region 81 than are the side faces of the first substrate 2 and the side faces of the second substrate 3, as shown in FIG. 2, portions encircled by broken lines in FIG. 2 will not be able to perform displaying.

In the liquid crystal display panel 100A, polarizers 22a and 22b are provided on the sides of the first substrate 2 and the second substrate 3 respectively opposite from the liquid crystal layer 1. The polarizer 22a and the polarizer 22b are disposed so that their transmission axes are orthogonal to each other, for example. As necessary, an optical compensation film may be provided. Note that a liquid crystal display panel having such a construction is called a VA (Vertical Alignment) mode liquid crystal display panel. The liquid crystal display panel 100A is a liquid crystal display panel of the normally-black mode.

The liquid crystal display panel 100A includes thin film transistors (TFTs)(not shown) and pixel electrodes 4 which are formed on the first substrate 2 correspondingly to respective pixels, a color filter layer 32 formed on the second substrate 3, and a common electrode 5 formed on the color filter layer 32. The pixel electrodes 4 are formed to near the side faces of the first substrate 2. The common electrode 5 is formed substantially across the entire surface of the second substrate 3 (see FIG. 1(b)).

The respective TFTs of the liquid crystal display panel 100A are electrically connected to an external circuit via an FPC (Flexible Printed Circuit) 95, for example. Other than an FPC, each TFT may be electrically connected to an external circuit by way of an LSI (Large Scale Integration) driver, TAB (Tape Automated Bonding), or COF (Chip On Film).

Furthermore, as necessary, a side-face sealing resin portion may be formed on the side faces of the liquid crystal display panel 100A. By forming a side-face sealing resin portion, the mechanical strength of the liquid crystal display panel 100A is improved, and intrusion of moisture or the like into the polymer-containing liquid crystal region 82 is reduced, whereby reliability is enhanced. The side-face sealing resin portion is made of a UV-curing resin, for example.

Figure 3:
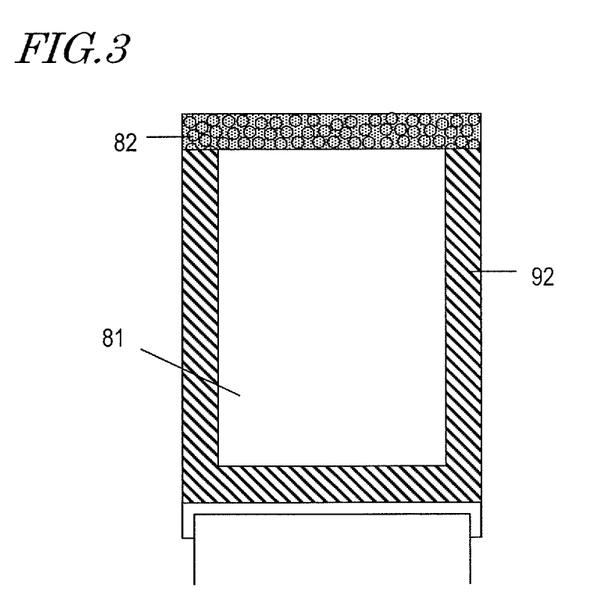
FIG. 3 A schematic plan view for describing a modification of the liquid crystal display panel 100A.

In the liquid crystal display panel 100A, the polymer-containing liquid crystal region 82 is formed so as to surround the nematic liquid crystal region 81. Depending on the intended use, the liquid crystal display panel 100A may be modified into a liquid crystal display panel such that, as shown in FIG. 3, one side surrounding the nematic liquid crystal region 81 is formed of the polymer-containing liquid crystal region 82, while a sealing portion 92 is formed on the other sides. The sealing portion 92 is made of a UV-curing resin, for example, and does not contain any liquid crystal material.

Next, a liquid crystal display panel 100B (not shown) according to another embodiment of the present invention will be described. Component elements which are identical to those in the liquid crystal display panel 100A will be denoted by like reference numerals, and their descriptions will not be repeated. Note that the liquid crystal display panel 100B and the liquid crystal display panels 100C and 100D described below differ from the liquid crystal display panel 100A in terms of driving modes.

Instead of the negative nematic liquid crystal material contained by the liquid crystal display panel 100A, the liquid crystal display panel 100B contains a positive nematic liquid crystal material. In the liquid crystal display panel 100B, the positive nematic liquid crystal material in the nematic liquid crystal region 81 may contain a chiral agent in some cases. Furthermore, instead of the first and second vertical alignment films of the liquid crystal display panel 100A, the liquid crystal display panel 100B includes first and second horizontal alignment films (e.g., PLX1400 manufactured by HD MicroSystems, Ltd.).

The first horizontal alignment film and the second horizontal alignment film are each subjected to an alignment treatment (e.g., rubbing treatment). Furthermore, they are subjected to alignment treatments such that the direction of the alignment treatment performed for the first horizontal alignment film is orthogonal to the direction of the alignment treatment performed for the second horizontal alignment film.

The liquid crystal display panel 100B is a TN (Twisted Nematic) type liquid crystal display panel. Therefore, the liquid crystal display panel 100B includes two liquid crystal regions, as the nematic liquid crystal region 81 and the liquid crystal subregions 11, in which an azimuth of tilt of liquid crystal molecules at the interface with the first horizontal alignment film differs from an azimuth of tilt of liquid crystal molecules at the interface with the second horizontal alignment film in the absence of applied voltage. The liquid crystal display panel 100B is a normally-white mode liquid crystal display panel.

Figure 4:
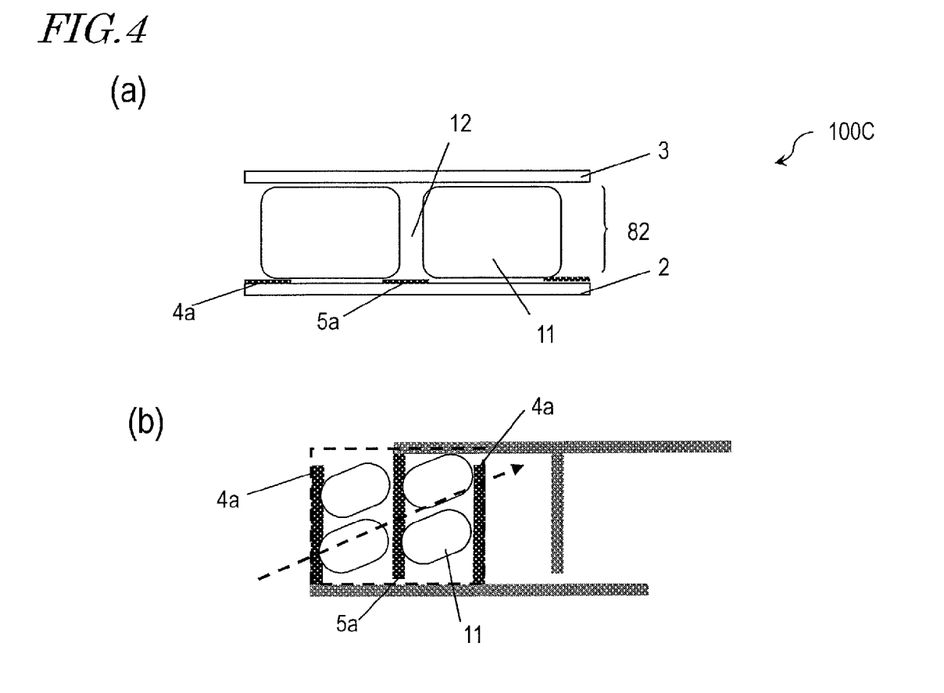

Next, with reference to FIG. 4, a liquid crystal display panel 100C according to another embodiment of the present invention will be described. Component elements which are identical to those in the liquid crystal display panel 100B will be denoted by like reference numerals, and their descriptions will not be repeated. FIG. 4(*a*) is a schematic cross-sectional view for describing the liquid crystal display panel 100C, and FIG. 4(*b*) is a schematic plan view for describing the liquid crystal display panel 100C.

On the liquid crystal display panel 100C shown in FIG. 4(*a*) and FIG. 4(*b*), a pair of interdigitated electrodes 4*a* and 5*a* are formed, instead of the pixel electrodes 4 and common electrode 5 of the liquid crystal display panel 100B. The pair of interdigitated electrodes 4*a* and 5*a* are formed both on the first substrate 2. Similarly to the liquid crystal display panel 100B, the liquid crystal display panel 100C also includes a first horizontal alignment film formed on the first substrate 2 and a second horizontal alignment film formed on the second substrate 3; however, unlike in the liquid crystal display panel 100B, the horizontal alignment films in the liquid crystal display panel 100C are subjected to alignment treatments such that the directions of the alignment treatments performed for the respective horizontal alignment films are antiparallel. The liquid crystal display panel 100C controls the alignment state of the nematic liquid crystal material in the nematic liquid crystal region 81 and the liquid crystal subregions 11 with a lateral electric field. As such, the liquid crystal display panel 100C is called a liquid crystal display panel of an IPS (In Plane Switching) driving mode. The liquid crystal display panel 100C is a normally-black mode liquid crystal display panel. Instead of forming a horizontal alignment film on each of the first substrate 2 and the second substrate 3, a vertical alignment film may be formed on each of the first substrate 2 and the second substrate 3.

Figure 5:
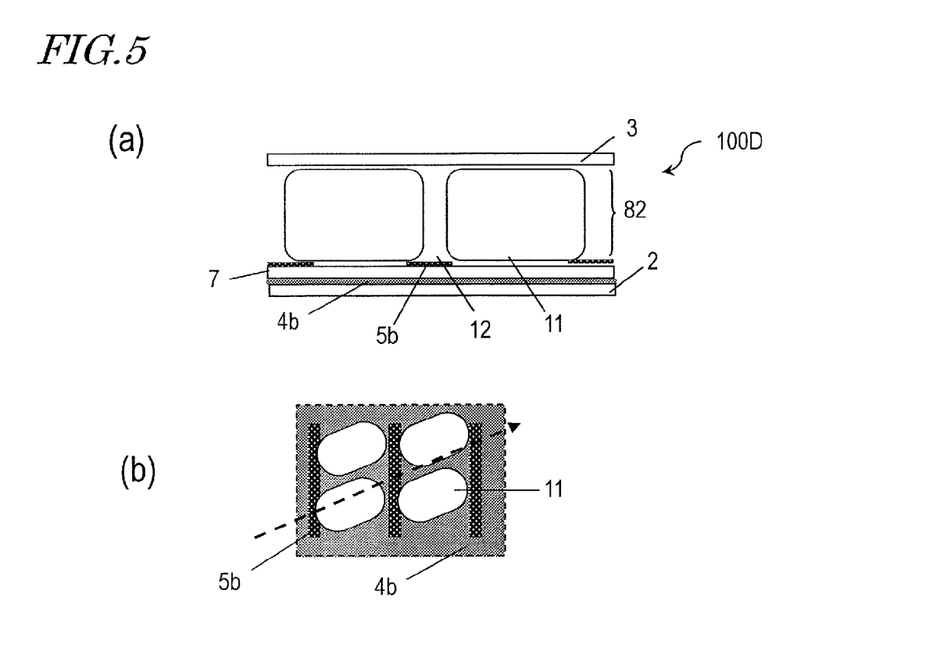

Next, with reference to FIG. 5, a liquid crystal display panel 100D according to another embodiment of the present invention will be described. Component elements which are identical to those in the liquid crystal display panel 100C will be denoted by like reference numerals, and their descriptions will not be repeated. FIG. 5(*a*) is a schematic cross-sectional view for describing the liquid crystal display panel 100D, and FIG. 5(*b*) is a schematic plan view for describing the liquid crystal display panel 100D.

Instead of forming the pair of interdigitated electrodes 4*a* and 5*a* of the liquid crystal display panel 100C, the liquid crystal display panel 100D shown in FIG. 5(*a*) and FIG. 5(*b*) includes a lower electrode 4*b* which is formed substantially across the entire displaying region of the first substrate 2, an insulating layer 7 formed on the lower electrode 4*b*, and interdigitated electrodes 5*b* formed on the insulating layer 7. Similarly to the liquid crystal display panel 100C, the liquid crystal display panel 100D also controls the alignment state of the nematic liquid crystal material in the nematic liquid crystal region 81 and the liquid crystal subregions 11 with a lateral electric field. As such, the liquid crystal display panel 100D is called a liquid crystal display panel of an FFS (Fringe Field Switching) driving mode. In the liquid crystal display panel 100D, a vertical alignment film may be formed on each of the first substrate 2 and the second substrate 3, instead of a horizontal alignment film formed on each of the first substrate 2 and the second substrate 3.

Figure 6:
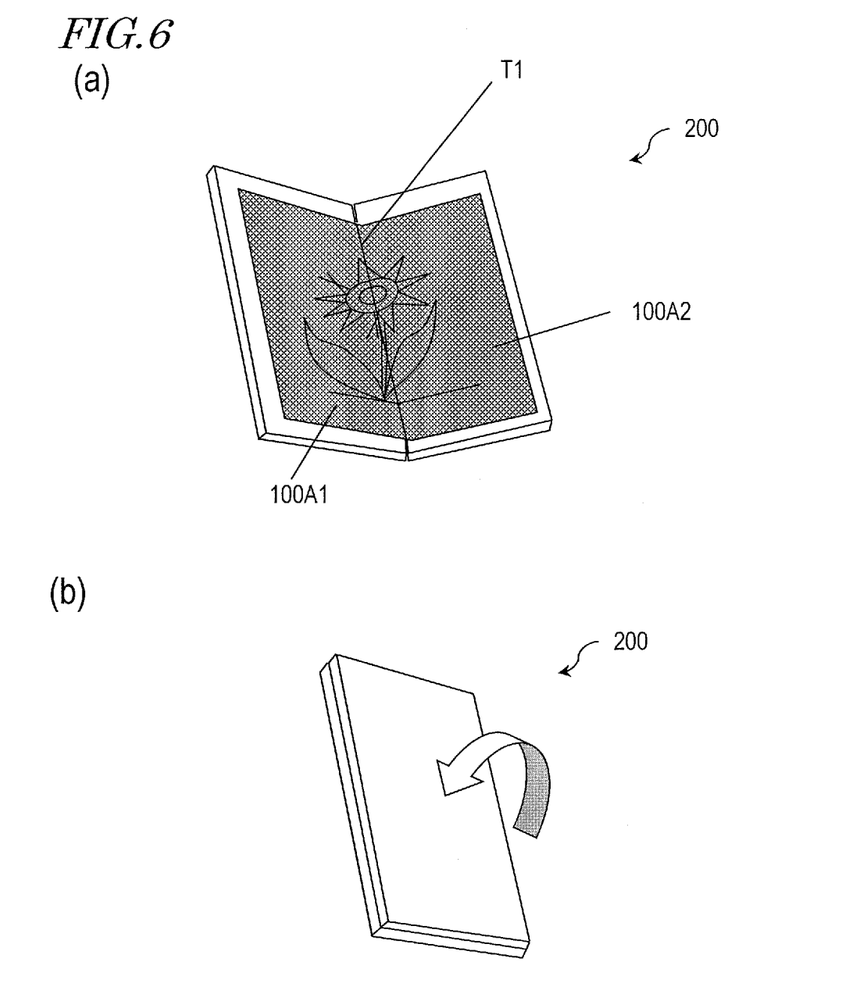

Next, an electronic device 200 in which the liquid crystal display panels 100A to 100D are used will be described with reference to FIG. 6. FIG. 6(*a*) and FIG. 6(*b*) are schematic perspective views of the electronic device 200.

For example, the aforementioned liquid crystal display panels 100A to 100D may be combined to produce a large-sized display device. Otherwise, as shown in FIG. 6(*a*) and FIG. 6(*b*), the aforementioned liquid crystal display panels 100A to 100D are applicable to an electronic device 200 which can be laid open like a book. The electronic device 200 includes a first liquid crystal display panel 100A1 and a second liquid crystal display panel 100A2 having the same construction as the liquid crystal display panel 100A, for example. The liquid crystal display panels 100A1 and 100A2 of the electronic device 200 are disposed so that a first side face, which is a side face of the one liquid crystal display panel 100A1 that contains a side face of the polymer-containing liquid crystal region 82, and a second side face, which is a side face of the other liquid crystal display panel 100A2 that contains a side face of the polymer-containing liquid crystal region 82, adjoin each other. In the electronic device 200 as such, the arrangement of the liquid crystal display panels 100A1 and 100A2 achieves continuous displaying as if a single liquid crystal display panel. Moreover, when it is made foldable around an axis which is the boundary T1 between the first side face and the second side face, the electronic device 200 can attain a large display screen size while retaining excellent portability.

Figure 7:
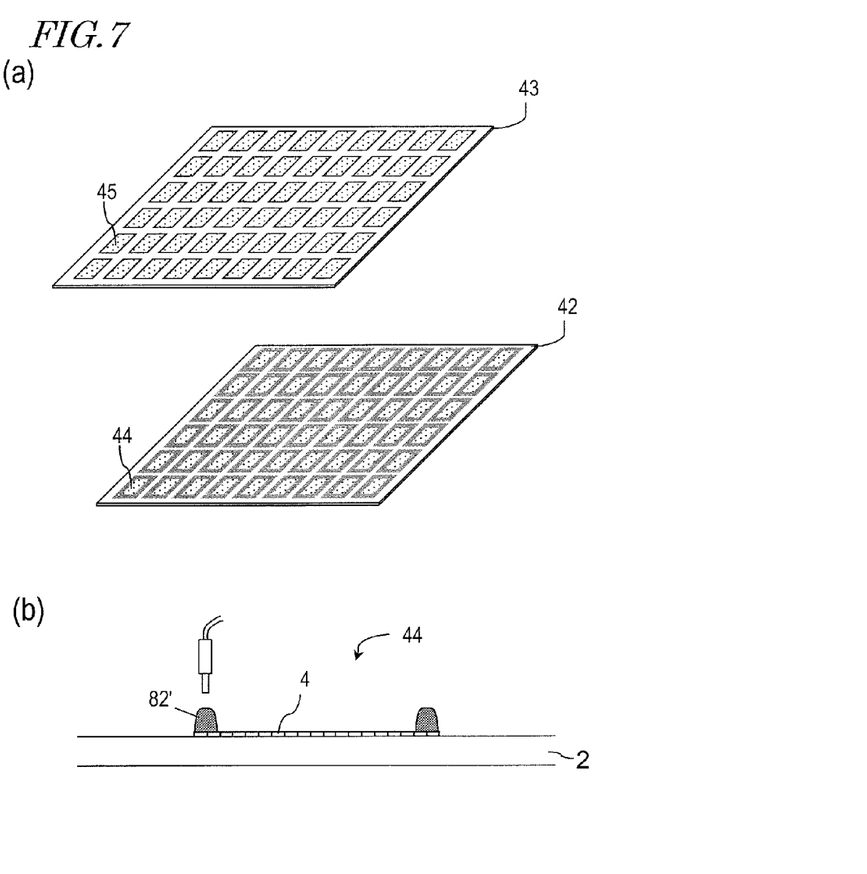
Figure 8:
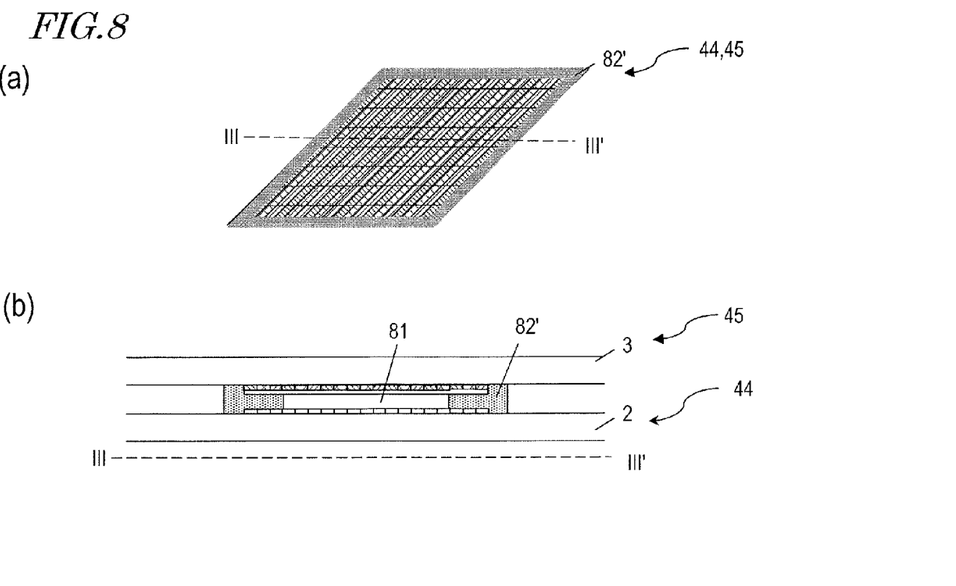
Figure 9:
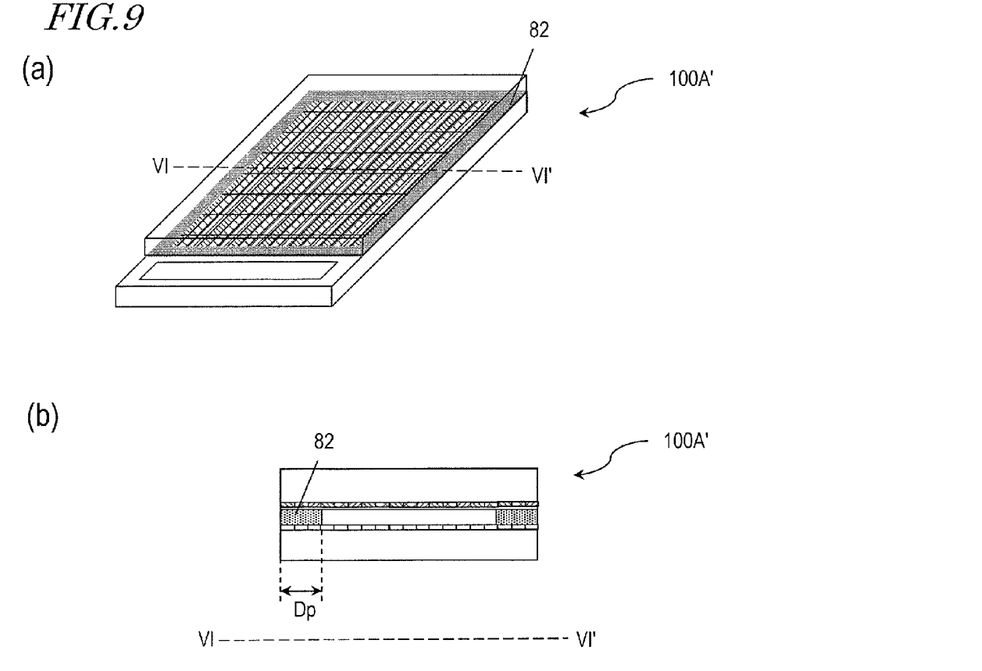
Figure 10:
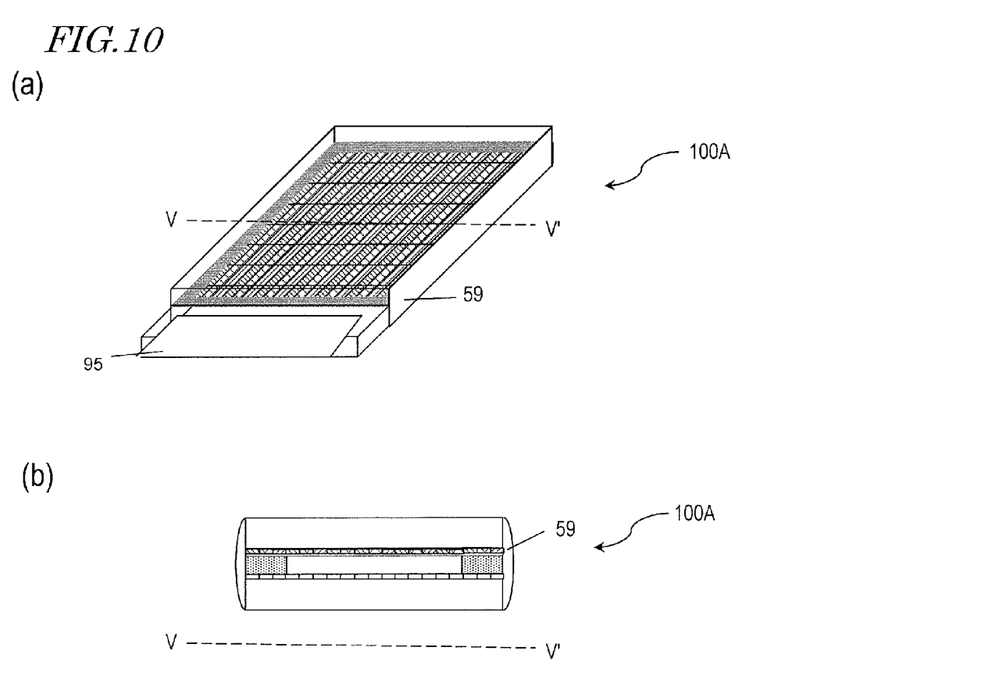

Next, with reference to FIG. 7 to FIG. 10, a production method of the liquid crystal display panel 100A according to an embodiment of the present invention will be described. FIG. 7(a) is a schematic perspective view for describing a production method of the liquid crystal display panel 100A. FIG. 7(b) is a schematic cross-sectional view of one TFT substrate 44. FIG. 8(a) is a schematic perspective view for describing a production method of the liquid crystal display panel 100A. FIG. 8(b) is a schematic cross-sectional view along line III-III' in FIG. 8(a). FIG. 9(a) is a schematic perspective view for describing a production method of the liquid crystal display panel 100A. FIG. 9(b) is a schematic cross-sectional view along line VI-VI' in FIG. 9(a). FIG. 10(a) is a schematic perspective view for describing a production method of the liquid crystal display panel 100A. FIG. 10(b) is a schematic cross-sectional view along line V-V' in FIG. 10(a).

The production method of the liquid crystal display panel 100A includes: (A) a step of providing the first substrate 2 and the second substrate 3, (B) a step of applying a nematic liquid crystal material onto a first region of the surface of the first substrate 2, (C) a step of applying a liquid mixture containing a nematic liquid crystal material and a monomer onto a second region of the surface of the first substrate 2 which is located outside the first region, (D) a step of attaching together the first substrate 2 and the second substrate 3, and (E) a step of polymerizing the monomer.

Next, the production method of the liquid crystal display panel 100A will be specifically described.

As shown in FIG. 7(a) and FIG. 7(b), a first mother substrate 42 and a second mother substrate 43 are provided. A plurality of TFT substrates 44 are formed in the first mother substrate 42. On each of the plurality of TFT substrates 44, for example, a thin film transistor (TFT) is formed for each pixel by a known method, and a vertical alignment film (not shown) is formed substantially across the entire TFT substrate 44 by a known method. In the second mother substrate 43, a plurality of color filter substrates 45 having a color filter layer are formed by a known method, and a vertical alignment film (not shown) is formed substantially across the entire color filter substrate 45 by a known method.

Next, a liquid mixture 82' in which a nematic liquid crystal material (e.g., a negative type nematic liquid crystal material) and a monomer are mixed is applied to each TFT substrate 44 by an ODF (One Drop Fill) technique. The liquid mixture 82' is applied at substantially the outer edge (corresponding to the second region) of a region of each TFT substrate 44 in which the pixel electrodes 4 are formed. Herein, the weight ratio between the nematic liquid crystal material and the monomer is 80:20 (nematic liquid crystal material: monomer=80:20). The weight ratio is not limited thereto, and a liquid mixture having a monomer concentration which is not less than 10 mass % and not more than 30 mass % may be used. Walls of polymer that have been formed from the monomer are regions not contributing to displaying. Therefore, when the monomer concentration is less than 10 mass %, the transmittance of the liquid crystal display panel 100A, i.e., luminance of displaying, increases, but the mechanical strength of the liquid crystal display panel 100A is deteriorated. When the monomer concentration is more than 30 mass %, the liquid crystal display panel 100A has a high mechanical strength, but the transmittance of the liquid crystal display panel 100A, i.e., luminance of displaying, decreases.

Next, by ODF technique, a nematic liquid crystal material (e.g., a negative type nematic liquid crystal material) is applied to the TFT substrate 44, in a region (corresponding to the first region) surrounded by the liquid mixture 82'.

Next, as shown in FIG. 8(a) and FIG. 8(b), by a known method, the TFT substrate 44 (first mother substrate 42) and the color filter substrate 45 (second mother substrate 43) are attached together, and thereafter the monomer in the liquid mixture 82' is cured by being irradiated with ultraviolet. The cumulative light amount for curing the monomer in the liquid mixture 82' is about 1 to 4 $J/cm^2$ for light of a wavelength of 365 nm, although it depends on the material. Curing the monomer of the liquid mixture 82' allows the polymer-containing liquid crystal region 82 to be formed. The liquid crystal layer 1 is surfaced by the polymer-containing liquid crystal region 82.

Next, as shown in FIG. 9(a) and FIG. 9(b), the mother panel composed of the first mother substrate 42 and the second mother substrate 43 attached together is cut into each liquid crystal display panel 100A' by a known method. At this time, the width Dp of the polymer-containing liquid crystal region 82 is about 1 mm.

Next, with reference to FIG. 10(a) and FIG. 10(b), the side faces of the liquid crystal display panel 100A' are sealed with a side-face sealing resin portion 59. The side-face sealing resin portion 59 is made of a UV-curing resin, for example. Thereafter, polarizers 22a and 22b are placed on the sides of the first substrate 2 and the second substrate 3 of the liquid crystal display panel 100A' respectively opposite from the liquid crystal layer 1. Other than the polarizers 22a and 22b, optical compensation films or the like may be placed on the sides of the first substrate 2 and the second substrate 3 opposite from the liquid crystal layer 1. Furthermore, an FPC 95 is provided to allow each TFT of the liquid crystal display panel 100A to be connected to an external circuit. The liquid crystal display panel 100A is produced in this manner.

Thus, with the liquid crystal display panels 100A to 100D according to embodiments of the present invention, there is provided a liquid crystal display panel which is suitable for a narrowed frame region and which has a good mass production efficiency.

INDUSTRIAL APPLICABILITY

According to an embodiment of the present invention, there is provided a liquid crystal display panel which is suitable for a narrowed frame region. In particular, it is suitably used as a liquid crystal display panel for a medium to small-sized device such as an electronic book, a mobile phone, or a smartphone, for example.

REFERENCE SIGNS LIST 1 liquid crystal layer
2, 3 substrate
4 pixel electrode
5 common electrode
11 liquid crystal subregion
12 wall
22a, 22b polarizer 32 color filter layer
81 first liquid crystal region
82 second liquid crystal region
95 FPC
100A liquid crystal display panel
Dp width

The invention claimed is:

1. A liquid crystal display panel comprising: a first substrate and a second substrate and a liquid crystal layer retained between the first substrate and the second substrate, the liquid crystal display panel having a plurality of pixels, wherein
the liquid crystal layer has a first liquid crystal region and a second liquid crystal region provided outside the first liquid crystal region;
the first liquid crystal region is composed essentially of a nematic liquid crystal material alone;
the second liquid crystal region has a plurality of liquid crystal subregions containing a nematic liquid crystal material and polymer-containing walls formed between adjacent ones of the plurality of liquid crystal subregions;
the plurality of pixels include pixels accounting for the first liquid crystal region and pixels accounting for the second liquid crystal region;
the first liquid crystal region is surrounded by the second liquid crystal region; and
a peripheral portion of the liquid crystal display panel is provided with the second liquid crystal region provided in a continuous manner.

2. The liquid crystal display panel of claim 1, further comprising:
a first alignment film and a second alignment film formed between the first liquid crystal region and second liquid crystal region and the first substrate and second substrate so as to be in contact with the first liquid crystal region and the second liquid crystal region; and
polarizers respectively provided on sides of the first substrate and the second substrate opposite from the liquid crystal layer.

3. The liquid crystal display panel of claim 2, wherein,
the nematic liquid crystal material has positive dielectric anisotropy;
at least one of the first alignment film and the second alignment film is a horizontal alignment film;
the horizontal alignment film has been subjected to an alignment treatment; and,
in the first liquid crystal region and in the plurality of liquid crystal subregions, absent applied voltage, an in-plane azimuth of liquid crystal molecules at an interface with the horizontal alignment film which has been subjected to the alignment treatment is parallel to an azimuth defined by the alignment treatment.

4. The liquid crystal display panel of claim 3 including two liquid crystal regions such that, in the absence of applied voltage, an azimuth of tilt of liquid crystal molecules at an interface with the first alignment film in the first liquid crystal region and in the plurality of liquid crystal subregions differs from an azimuth of tilt of liquid crystal molecules at an interface with the second alignment film in the first liquid crystal region and in the plurality of liquid crystal subregions.

5. The liquid crystal display panel of claim 2, wherein the liquid crystal display panel is a normally-black mode liquid crystal display panel.

6. The liquid crystal display panel of claim 2, wherein the liquid crystal display panel is a normally-white mode liquid crystal display panel.

7. The liquid crystal display panel of claim 2, wherein
the nematic liquid crystal material has negative dielectric anisotropy; and
the first alignment film and the second alignment film are vertical alignment films.

8. An electronic device comprising first and second liquid crystal display panels, each of the first and second liquid crystal display panels being the liquid crystal display panel of claim 1, wherein
the first and second liquid crystal display panels are disposed so that a first side face and a second side face adjoin each other, the first side face being a side face of the first liquid crystal display panel containing a side face of the second liquid crystal region, and the second side face being a side face of the second liquid crystal display panel containing a side face of the second liquid crystal region.

9. The electronic device of claim 8 being foldable around an axis which is a boundary between the first side face and the second side face.

10. The liquid crystal display panel of claim 1, wherein, when viewed from a normal direction of the liquid crystal display panel, at least one outer side face of the second liquid crystal region is level with at least one of side faces of the first substrate and side faces of the second substrate.

11. The liquid crystal display panel of claim 1, wherein a sealing portion is formed between at least one side face of the second liquid crystal region and at least one side face of the first substrate.

12. The liquid crystal display panel of claim 1, wherein no sealing portion is formed between the first substrate and the second substrate.

13. The liquid crystal display panel of claim 1, wherein the second liquid crystal region has a width of 1.5 mm or less.

14. The liquid crystal display panel of claim 1, further comprising a side-face sealing resin portion formed so as to be in contact with an outer side face of the second liquid crystal region, a side face of the first substrate, and a side face of the second substrate.

* * * * *